United States Patent
Destefanis et al.

(10) Patent No.: US 12,177,356 B2
(45) Date of Patent: Dec. 24, 2024

(54) METHODS AND SYSTEMS FOR A CONSISTENT DISTRIBUTED MEMORY POOL IN A BLOCKCHAIN NETWORK

(71) Applicant: nChain Holdings Limited, St. John's (AG)

(72) Inventors: Giuseppe Destefanis, London (GB); Simone Madeo, London (GB); Patrick Motylinski, London (GB); Stephane Vincent, Luxembourg (LU); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 324 days.

(21) Appl. No.: 16/625,631

(22) PCT Filed: Jun. 19, 2018

(86) PCT No.: PCT/IB2018/054502
§ 371 (c)(1),
(2) Date: Dec. 20, 2019

(87) PCT Pub. No.: WO2018/234988
PCT Pub. Date: Dec. 27, 2018

(65) Prior Publication Data
US 2021/0160077 A1 May 27, 2021

(30) Foreign Application Priority Data
Jun. 20, 2017 (GB) .................. 1709845

(51) Int. Cl.
*H04L 9/00* (2022.01)
*G06F 9/50* (2006.01)
(Continued)

(52) U.S. Cl.
CPC .......... *H04L 9/3236* (2013.01); *G06F 9/5016* (2013.01); *H04L 9/0825* (2013.01);
(Continued)

(58) Field of Classification Search
CPC ..... H04L 9/3236; H04L 9/0825; H04L 45/02; H04L 45/44; H04L 67/1097; H04L 2209/38; H04L 2209/56; G06F 9/5016
See application file for complete search history.

(56) References Cited

U.S. PATENT DOCUMENTS 6,751,616 B1 * 6/2004 Chan .................. G06F 16/2255
7,827,182 B1 * 11/2010 Panigrahy ............... G06F 16/10
707/747

(Continued)

FOREIGN PATENT DOCUMENTS

CN 103729461 A 4/2014
EP 2230799 A1 9/2010

OTHER PUBLICATIONS

Antonopoulos "Mastering Bitcoin. Unlocking Digital Crypto-Currencies", O'Reilly Media, Apr. 2014 (Year: 2014).*
(Continued)

*Primary Examiner* — David J Pearson
(74) *Attorney, Agent, or Firm* — Davis Wright Tremaine LLP (57) ABSTRACT

Techniques and computer-implemented methods are presented to be implemented on a distributed mempool network (DMP) implementing a distributed hash table (DHT). The method includes: receiving, at a mempool node of a DMP, a request to update routing information of the mempool node; initializing a set of random walks within a key space of the DHT, the set of random walks used for generating a set of key-value records; selecting a particular iteration of a long-distance table of a set of long-distance tables; selecting, from the particular iteration of the long-distance table, a pointer within a range between identification information and a key; and transmitting a query to another mempool node associated with the pointer, wherein the other mempool node maintains a set of weight associated connections to a
(Continued)

set of mempool nodes, wherein the weight is proportional to the level of trust in the connection.

18 Claims, 7 Drawing Sheets

(51) Int. Cl.
    *H04L 9/08*           (2006.01)
    *H04L 9/32*           (2006.01)
    *H04L 45/02*          (2022.01)
    *H04L 45/44*          (2022.01)
    *H04L 67/1097*       (2022.01)

(52) U.S. Cl.
    CPC .............. *H04L 45/02* (2013.01); *H04L 45/44* (2013.01); *H04L 67/1097* (2013.01); *H04L 9/50* (2022.05); *H04L 2209/56* (2013.01)

(56) References Cited

U.S. PATENT DOCUMENTS

| | | | | |
|---|---|---|---|---|
| 8,688,639 | B2* | 4/2014 | Chou ................. | G06F 16/1837 707/630 |
| 8,832,091 | B1 | 9/2014 | Bhagat et al. | |
| 2005/0135381 | A1* | 6/2005 | Dubnicki ............ | H04L 67/1046 370/395.32 |
| 2007/0002869 | A1* | 1/2007 | Miller .................. | H04L 45/745 370/395.32 |
| 2007/0230482 | A1* | 10/2007 | Shim ................... | H04L 67/1065 370/400 |
| 2008/0270626 | A1* | 10/2008 | Takeda ................ | H04L 61/2575 709/238 |
| 2009/0116484 | A1* | 5/2009 | Buford ................... | H04L 45/00 370/392 |
| 2010/0146128 | A1* | 6/2010 | Kulkarni ................. | A63F 13/34 709/228 |
| 2010/0268820 | A1* | 10/2010 | Shi ....................... | H04L 67/1065 709/224 |
| 2010/0293295 | A1 | 11/2010 | Tian et al. | |
| 2012/0330864 | A1 | 12/2012 | Chakrabarti et al. | |
| 2013/0318228 | A1* | 11/2013 | Raja ...................... | G06F 3/0613 718/1 |
| 2014/0149376 | A1* | 5/2014 | Kutaragi ............. | G06F 18/2323 707/706 |
| 2014/0281215 | A1 | 9/2014 | Chen et al. | |
| 2015/0269541 | A1 | 9/2015 | MacGregor et al. | |
| 2016/0094448 | A1 | 3/2016 | Peacock et al. | |
| 2017/0036123 | A1 | 2/2017 | Liggett et al. | |
| 2018/0139278 | A1* | 5/2018 | Bathen ................. | H04L 9/3247 |

OTHER PUBLICATIONS

Kumar et al. "Efficient_and_scalable_query_routing_for_unstructured_peer-to-peer_networks", Proceedings IEEE 24th Annual Joint Conference of the IEEE Computer and Communications Societies, Mar. 2005 (Year: 2005).*

Puttaswamy et al. "A_Case_for_Unstructured_Distributed_Hash_Tables", Tenth IEEE Global Internet Symposium, 2007 (Year: 2007).*

Lesniewski-Laas et al. "Whanau: A Sybil-proof Distributed Hash Table"; 7th USENIX Symposium on Networked Systems Design and Implementation, NSDI 2010 (Year: 2010).*

Ali et al., "Blockstack : A New Decentralized Internet," retrieved from https://pdfs.semanticscholar.org/606b/2c57cfed73-28dedf88556ac657e9e1608311.pdf, 2017, 22 pages.

Deathandtaxes, "Using a DHT to Reduce the Resource Requirements of Full Nodes," retrieved from https://bitcointalk.org/index.php?topic=662734.0, Jun. 23, 2014, 11 pages.

Greatwolf, "What Happens if EVERYONE Prunes Blocks?" retrieved from https://www.reddit.com/r/Bitcoin/comments/3det7n/what_happens_if_everyone_prunes_bloc ks/, Jul. 15, 2015, 7 pages.

Gronager, "[Bitcoin\-development\] Blocking Uneconomical UTXO Creation," retrieved from https://www.mail-archive.com/search?l=bitcoin-development@lists.sourceforge.net&q=subject:%22\[Bitcoin\-development\]+Blocking+uneconomical+UTXO+creation%22&o=newest&f=1, Mar. 13, 2013, 21 pages.

International Search Report and Written Opinion mailed Sep. 5, 2018, Patent Application No. PCT/IB2018/054502, 14 pages.

IRC, "Chat Logs from Bitcoin-Wizard IRC Channel," retrieved from https://download.wpsoftware.net/bitcoin/wizards/2015-05-10.html, Oct. 5, 2015, 7 pages.

Jgarzik, "Chat Logs from Bitcoin Wizard IRC Channel," retrieved from https://download.wpsoftware.net/bitcoin/wizards/2014-08-06.html, Aug. 6, 2014, 15 pages.

Kaminsky, "I Tried to Hack Bitcoin and Failed," retrieved from https://www.reddit.com/r/Bitcoin/comments/1c7lzi/_tried_to_hack_bitcoin_and_failed_dan_kaminsky/aminsky/, Sep. 9, 2010, 24 pages.

Killerstorm, "I Tried to Hack BitCoin and Failed—Dan Kaminsky," retrieved from https://www.reddit.com/r/Bitcoin/comments/1c7lzi/i_tried_to_hack_bitcoin_and_failed_dan_kaminsky/aminsky/, Apr. 12, 2013, 29 pages.

Lesniewski-Lass, "Design and Applications of a Secure and Decentralized Distributed Hash Table," retrieved from https://core.ac.uk/download/pdf/4429114.pdf, Mar. 10, 2011, 114 pages.

Liu et al., "Speedy: A Sybil-Resistant DHT Implementation," retrieved from https://courses.csail.mit.edu/6.857/2014/files/25-liu-long-thaker-zheng-speedy-dht.pdf, Mar. 15, 2014, 13 pages.

Maxwell, "IRC Chat Logs," retrieved from https://download.wpsoftware.net/bitcoin/wizards/2013/11/13-11-27.log, Nov. 27, 2013, 8 pages.

Mohaisen et al., "Keep your Friends Close: Incorporating Trust into Social Network-Based Sybil Defenses," retrieved from https://www-users.cs.umn.edu/~hopper/sybil-infocom.pdf, 2011, 9 pages.

Nakamoto, "Bitcoin: A Peer-to-Peer Electronic Cash System," Bitcoin, Oct. 31, 2008, https://bitcoin.org/bitcoin.pdf, 9 pages.

Norberg et al., "Storing Arbitrary Data in the DHT," retrieved from http://bittorrent.org/beps/bep_0044.html, Dec. 19, 2014, 8 pages.

Satoshi et al., "Connection Limits," Bitcoin Forum, Aug. 9, 2010, https://bitcointalk.org/index.php?topic=741.0; prev_next=prev, 2 pages.

Sidhujag, "IRC Logs for #IPFS," retrieved from https://botbot.me/freenode/ipfs/2017-03-15/?page=6, Mar. 15, 2017, 13 pages.

Todd, "[ANN][XCP] Counterparty—Pioneering Peer-to-Peer Finance—Official Thread," retrieved from https://bitcointalk.org/index.php?topic=395761.msg5970778;topicseen, Mar. 29, 2014, 9 pages.

UK Commercial Search Report mailed Oct. 25, 2017, Patent Application No. GB1709845.0, 10 pages.

UK IPO Search Report mailed Dec. 8, 2017, Patent Application No. GB1709845.0, 5 pages.

Lesniewski-Laas et al., "A Sybil-Proof Distributed Hash Table" NSDI, Apr. 28, 2010, 30 pages.

* cited by examiner

METHODS AND SYSTEMS FOR A CONSISTENT DISTRIBUTED MEMORY POOL IN A BLOCKCHAIN NETWORK

CROSS REFERENCE TO RELATED APPLICATIONS

This application is a 371 National Stage of International Patent Application No. PCT/IB2018/054502, filed Jun. 19, 2018, which claims priority to United Kingdom Patent Application No. 1709845.0, filed Jun. 20, 2017, the disclosures of which are incorporated herein by reference in their entirety.

This invention relates generally to computer-based storage and transfer technologies. It also relates to distributed hash tables, and more particularly to methods and devices to improve security and consistency for storage and retrieval of shared information. The invention is particularly suited, but not limited to, use in blockchain applications and blockchain-implemented transfers. It also relates to improved speed of operations via a blockchain network, by enabling faster reading and writing operations, and relates to improved security mechanisms for blockchain-implemented systems by preventing or reducing attacks and/or malicious activities such as routing and storage attacks such as, for example, in a distributed memory pool.

In this document we use the term 'blockchain' to include all forms of electronic, computer-based, distributed ledgers. These include consensus-based blockchain and transaction-chain technologies, permissioned and un-permissioned ledgers, shared ledgers, and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain, and alternative blockchain implementations and protocols fall within the scope of the present invention.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper-proof records of events, distributed processing etc.) while being more versatile in their applications.

A blockchain is a peer-to-peer, electronic ledger which is implemented as a computer-based decentralised, distributed system made up of blocks which in turn are made up of blockchain transactions. Each blockchain transaction is a data structure that encodes the transfer of control of a digital asset or record chain between participants in the blockchain system, and includes at least one input and at least one output. Each block contains a hash of the previous block so that blocks become chained together to create a permanent, unalterable record of all blockchain transactions which have been written to the blockchain since its inception. Blockchain transactions contain small programs known as scripts embedded into their inputs and outputs, which specify how and by whom the outputs of the blockchain transactions can be accessed. On the Bitcoin platform, these scripts are written using a stack-based scripting language.

In order for a blockchain transaction to be written to the blockchain, it must be "validated." Network nodes (miners) perform work to ensure that each blockchain transaction is valid, with invalid blockchain transactions rejected from the network. Software clients installed on the nodes perform this validation work on an unspent blockchain transaction (UTXO) by executing its locking and unlocking scripts. If execution of the locking and unlocking scripts evaluate to TRUE, the blockchain transaction is valid and the blockchain transaction is written to the blockchain. Thus, in order for a blockchain transaction to be written to the blockchain, it must be i) validated by the first node that receives the blockchain transaction—if the blockchain transaction is validated, the node relays it to the other nodes in the network; and ii) added to a new block built by a miner; and iii) mined, i.e., added to the public ledger of past blockchain transactions.

Network nodes that receive a new blockchain transaction will quickly try to push that blockchain transaction out to other nodes in the network. Before transmitting a new blockchain transaction to other nodes, it is "validated," meaning it is checked against a set of criteria to ensure the blockchain transaction meets the basic requirements for a proper blockchain transaction according to the applicable blockchain protocol.

In order for a blockchain transaction to be written to the blockchain, it is incorporated into a block by a node (a "miner") that is designed to collect blockchain transactions and form them into blocks. The miner then attempts to complete a "proof of work" with respect to the node. Miners throughout the blockchain network compete to be the first to assemble a block of blockchain transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the blockchain transactions in it to ensure it complies with the formal requirements of the protocol.

One of the bottlenecks associated with blockchain implementation is the delay associated with waiting for a miner to complete the proof of work that confirms a block of blockchain transactions and results in adding that block of blockchain transactions to the blockchain. Using the Bitcoin system as an example, the system, by design, takes about 10 minutes for a block to be confirmed and added to the blockchain. Meanwhile, unconfirmed blockchain transactions accumulate in a memory pool (herein referred to as a "mempool"), an approximately complete copy of which is maintained at each node in the network. Analysis of the Bitcoin architecture shows that, with its 10-minute block confirmation throughput, the system can handle transaction throughput of about 3 new unconfirmed blockchain transactions per second, based on the size of typical blockchain transactions and blocks, and the speed with which those accumulated unconfirmed blockchain transactions can be incorporated into new blocks.

It would be advantageous to enable or facilitate the use of widespread, cryptographically-secured exchanges using a blockchain-based network such as Bitcoin. Such an exchange could relate to, for example, payment processing such as for credit card transactions although the invention is not limited to financially-oriented applications. However, the transaction throughput of about 3 per second is insufficient for handling such electronic payments, which currently operate at a transactional volume of about 50,000 per second. Accordingly, it would be desirable to find a solution to the speed and scalability constraints that currently limit blockchain's ability to process high-volume transactions.

Such a solution has now been devised. Thus, in accordance with the present invention, there are provided methods and devices as defined in the appended claims.

In accordance with the invention, there may be provided methods and devices that enable fast propagation (including storage and retrieval) of blockchain transactions or other data through a network of mempool nodes (distributed mempool or DMP) designed to implement functionality of a distributed hash table (DHT) as described in greater detail below. The DMP implementing the DHT may include a plurality of mempool nodes distributed over a network (e.g., the DMP network) such as a merchant network or other network. In some embodiments, the DMP network stores data as records including a key and a value.

As described in greater detail below, the mempool nodes form a distributed system that provides storage and retrieval of (key, value) pairs where any participating mempool node can efficiently retrieve a value associated with a particular key. In some embodiments, the mempool nodes are also responsible for determining routing information and establishing paths and/or connections between mempool nodes. The data stored as the "value" of the (key, value) pairs may include any data capable of storage by a computer system including blockchain transactions as described in the present disclosure.

In an additional or alternative aspect, the present disclosure describes a mempool network node to facilitate fast distribution of blockchain transactions over a network of interconnected nodes used to implement a DHT of blockchain transactions, a subset of which are mempool network nodes interconnected by an overlay network. Hereafter, the term "mempool network node" may be used interchangeably with the terms "mempool node" for the sake of convenience only.

Therefore, in accordance with the invention, there may be provided a computer-implemented method (and corresponding system(s)) as defined in the appended claims.

The method may be described as a method for implementing a DHT using mempool nodes. The computer-implemented method includes: receiving, at a mempool node of distributed mempool network (DMP) implementing a distributed hash table (DHT), a request to update routing information of the mempool node; initializing a set of random walks within a key space of the DHT, the set of random walks used for generating a set of key-value records to be stored by the mempool node; generating a first record in an first table based at least in part on a first identification information stored in stored in a second of a long-distance table type; generating a second record in a third table of the long-distance table type by at least performing a first random walk of the set of random walks, the second record containing a second identification information and an address associated with the second identification information; generating a third record in a fourth table of a short-distance table type by at least obtaining records from a table maintained by a second mempool node of the DMP network.

These and other aspects of the present invention will be apparent from, and elucidated with reference to, the embodiment described herein. An embodiment of the present invention will now be described, by way of example only, and with reference to the accompanying drawings, in which:

Figure 1:
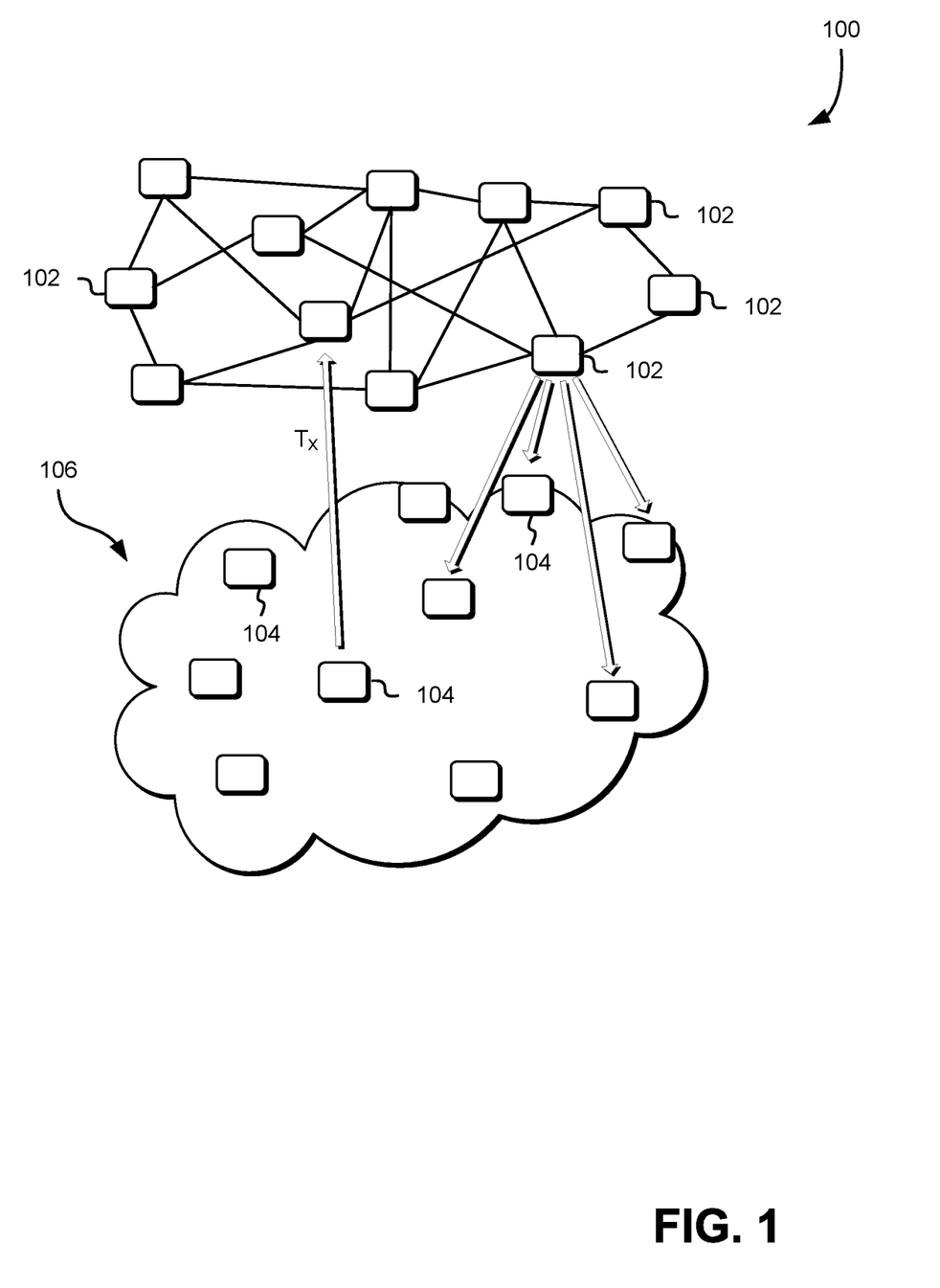
FIG. 1 illustrates an example network of nodes with an overlay network of mempool nodes in accordance with an embodiment.

Reference will first be made to FIG. 1, which illustrates, in block diagram form, an example network associated with a blockchain, which may be referred to herein as a blockchain network 100. The blockchain network 100 is a peer-to-peer open membership network which may be joined by anyone, without invitation and/or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example. In yet other embodiments, the blockchain network 100 may be a storage network running an instance of a DHT protocol described in greater detail, for example, in connection with FIG. 2.

The electronic devices that run the blockchain protocol and that form the nodes 102 of the blockchain network 100 may be of various types, including, for example, computers such as desktop computers, laptop computers, tablet computers, servers, mobile devices such a smartphones, wearable computers such as smart watches, or other electronic devices.

Nodes 102 of the blockchain network 100 are coupled to one another using suitable communication technologies, which may include wired and wireless communication technologies. In many cases, the blockchain network 100 is implemented at least partly over the Internet, and some of the nodes 102 may be located in geographically dispersed locations.

Nodes 102 maintain a global ledger of all blockchain transactions on the blockchain, grouped into blocks, each of which contains a hash of the previous block in the chain. The global ledger is a distributed ledger, and each node 102 may store a complete copy or a partial copy of the global ledger. Blockchain transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each blockchain transaction typically has one or more inputs and one or more outputs. Scripts embedded into the inputs and outputs specify how and by whom the outputs of the blockchain transactions can be accessed. The output of a blockchain transaction may be an address to which value is transferred as a result of the blockchain transaction. That value is then associated with that output address as an unspent blockchain transaction output (UTXO). A subsequent blockchain transaction may then reference that address as an input in order to unlock that value.

Nodes 102 may be of different types or categories, depending on their functionality. It has been suggested that there are four basic functions associated with a node 102: wallet, mining, full blockchain maintenance, and network routing. There may be variations of these functions. Nodes 102 may have more than one of the functions. For example, a "full node" offers all four functions. A lightweight node, such as may be implemented in a digital wallet, for example, may feature only wallet and network routing functions. Rather than storing the full blockchain, the digital wallet may keep track of block headers, which serve as indexes when querying blocks. Nodes 102 communicate with each other using a connection-oriented protocol, such as TCP/IP (Transmission Control Protocol). The mempool nodes 104, in various embodiments, are not members of the blockchain network and are not responsible for implementing the Bitcoin/Blockchain protocol.

The present application proposes and describes an additional type or category of node: a mempool node 104. In various embodiments, mempool nodes 104 provide fast propagation and retrieval of blockchain transactions. In such embodiments, the mempool nodes 104 do not store a full blockchain and do not perform mining functions. In that sense, they are similar to lightweight nodes or wallets; however, they include additional functionality to enable fast propagation and retrieval of blockchain transactions. The operational focus of the mempool nodes 104 is the propagation and retrieval of data stored in the DHT implemented by a DMP network, particularly in the case of blockchain implementations, propagating unconfirmed blockchain transactions to other mempool nodes 104, from which the unconfirmed blockchain transactions are quickly pushed out to other nodes 102 in the blockchain network 100.

The mempool nodes 104 may be collectively referred to as the DMP 106. In various embodiments, the mempool nodes 104 and the DMP 106 are implemented as part of a merchant network as described in the present disclosure. Although shown, for ease of illustration, as a physically distinct network in FIG. 1, the mempool nodes 104 may be integrated into the blockchain network 100. That is, the DMP 106 might be considered a sub-network within and distributed through the blockchain network 100. The mempool node 104 may perform one or more dedicated functions or services.

In order for the DMP 106 to run reliably and be able to offer service at a certain security level, the mempool nodes 104 need to maintain a good overview of the DMP 106, and thus an efficient routing protocol needs to be in place. Every time a mempool node 104 receives an update or gets a request, described in greater detail below, the mempool node 104 may need to broadcast information to several other mempool nodes 104, as well as to other nodes 102. In the context of the DMP 106, this amounts to finding a solution to the multiple traveling salesman problem (MTSP). There are a plethora of solutions that address this issue, any one of which may be employed in the DMP 106. The mempool nodes 104 each run routing optimization in some up-to-date form.

In some implementations, the DMP 106 is implemented as a decentralized IP multicast type of network.

In one example situation, a regular node 102 on the blockchain network 100 generates a blockchain transaction that is to be stored by the DMP 106. It may send the blockchain transaction to a mempool node 104, which then broadcasts it to other mempool nodes 104, or it may send the blockchain transaction directly to multiple mempool nodes 104 if it knows the IP address for the mempool nodes 104. In some examples, all mempool nodes 104 of the DMP 106 are members of a single address, so all blockchain transactions sent to that address are received by all mempool nodes 104; however, in some cases, there may be more than one address associated with the DMP 106, and a receiving mempool node 104 may assess, from routing information, whether further broadcast of the blockchain transaction to other addresses is required to propagate the blockchain transaction to the full DMP 106.

Each node 102 in the network 100 typically maintains a separate mempool containing the unconfirmed blockchain transactions it has seen and that have not yet been incorporated into the blockchain by a miner completing a proof-of-work. A significant growth in the number of blockchain transactions coming from use in payment processing would increase the volume of blockchain transactions to store in each mempool. Accordingly, although the nodes in the DMP 106 are able to receive a new blockchain transaction almost at the same time, they may have storage capability limitations with respect to a large and quickly changing mempool.

To address this problem, the present application proposes that the mempool nodes 104 use a shared mempool implemented by way of DMP 106.

Assuming an average size of a blockchain transaction (TX) of 500 bytes and a transaction rate of ~10 TX/s, the DMP 106 may receive ~400 GB of daily incoming data. The data is stored for varying amounts of time in a mempool of unconfirmed blockchain transactions. Accordingly, the DMP 106 requires significant storage and the capability to store data fast. In order not to put too many requirements on each individual mempool node 104, the mempool nodes 104 implement a shared mempool, e.g., the DMP 106. Instead of having each mempool node 104 keep all incoming TXs in its own mempool, each mempool node 104 stores only a certain fraction of the total, and hashes associated key-values of the rest.

DMPs are a class of decentralized distributed systems which allow the membership partitioning of a key set among nodes, and which are able to send messages in an efficient and optimized manner only to the owner of a given key. Each node of a network can be seen as a cell of an array of a hash table. DMPs are designed for managing a high number of nodes, allowing the possibility for new nodes to join the network, and for old nodes to leave and crash without compromising the integrity of the shared data. DMPs ensure decentralization (there is no central authority, nor central coordination), scalability (the system has an efficient behaviour with millions of nodes), and fault tolerance (the system is reliable and able to manage nodes which join and leave the network or crash). Each node of the network may stay in touch with only a small number of other nodes, so that in the presence of a change or a new piece of data, the network is not overloaded.

The same concept may be applied for the UTXO database, a database which contains the set of all unspent outputs on the blockchain. An UTXO database may be built using a DMP implementing a DHT in order to share the content among a set of nodes.

The DHT protocol described in greater detail below provides solutions to the problem above. Specifically, the DHT protocol provides global consensus for the validity of blockchain transaction stored in the mempool nodes 104, consistency and integrity of the stored data, provides fast propagation and retrieval operations, and prevents routing and storage attacks in the mempool nodes 104.

One factor to consider in dimensioning a robust DHT is the number of replicas needed to ensure robustness and reliability of the whole network. As already mentioned, nodes can join and leave the network, and this fact should not affect the availability of data. If a node which stores a blockchain transaction A leaves the network, it is necessary to find the blockchain transaction A in another portion of the network. In existing blockchain networks, like Bitcoin, for example, the network has a number of blockchain replicas equal to the number of full nodes in the network (an average of 5000 replicas), but this fact affects scalability.

In the presently-proposed the DMP 106, the mempool is not fully replicated at every mempool node 104, but instead is implemented by way of the DMP 106. To provide for reliability, the DMP 106 may be implemented so as to have some overlap; i.e., each blockchain transaction data item is replicated in more than one mempool node 104, although not in every mempool node 104. As an example, the DMP may be implemented so as to specify a minimal number of 2 replicas. This results in a probability of the 2 nodes going down at once in any given hour, assuming complete independence between nodes would be $(1/(24+365))^2 = 1.30 * 10^{-8}$.

Figure 2:
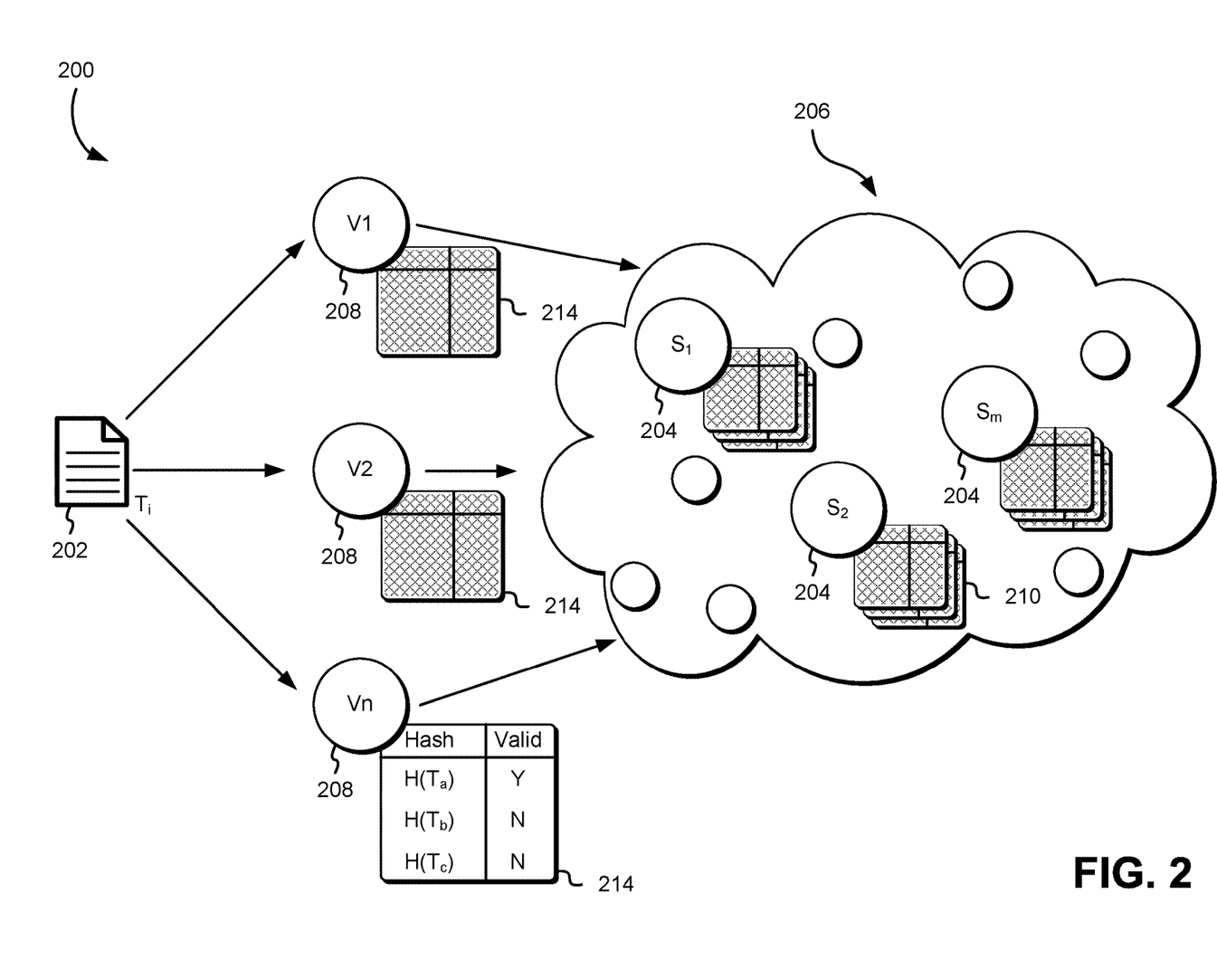
FIG. 2 illustrates an example network of mempool nodes implementing a DHT in accordance with an embodiment.

FIG. 2 illustrates, in diagram form, an example blockchain network 200 which includes validator nodes 208 (e.g., a node such as one of the nodes 102 illustrated in connection with FIG. 1) and mempool nodes 204 in accordance with an embodiment. In various embodiments, a particular blockchain transaction ($T_i$) 202 is processed by one or more validator nodes 208 and causes one or more mempool nodes 204 to store $T_i$ 202. The blockchain transaction $T_i$ 202 may include a transaction of a blockchain as described above. However, the storage of transactional information is just one embodiment of the DHT protocol described in the present disclosure. The protocol described in the present disclosure can be used for consistent and secure storage and retrieval for any data suitable for storage in a DMP.

Validator nodes 208 may apply various criteria for the validation of incoming $T_i$ 202. For example, depending on the computing parallelism provided by the computing resources executing the validator nodes 208 and/or ordering requirements of the $T_i$ 202, new blockchain transactions may be buffered before a full batch with an arbitrary size is scheduled for validation. In addition, the validator nodes 208 may be responsible for validating the format of blockchain transactions or other requests directed to the mempool nodes 204. In yet other embodiments, the validator nodes 208 determine if $T_i$ 202 has been validated by one or more other computer systems (e.g., validated based at least in part on a blockchain protocol).

The mempool nodes 204 provide a decentralized storage service enabling various operations such as a lookup operation, where the operations "lookup(k)" returns data associated with a key "k." Furthermore, the mempool nodes 204 implement a peer-to-peer system according to a DHT protocol to implement the DMP 106. The DMP 106 provides a common identifier space (e.g., a key space or set of all possible results of a hash function) for both mempool nodes 204 and keys, with each key k stored in the mempool node 204, with identifier closest to k according to a distance function. As described in greater detail below, the keys are not stored in the shared space using deterministic functions (e.g., hash function). In various embodiments, this may prevent or reduce the effectiveness of malicious nodes executing brute-force attack to generate an output that results in a malicious key being between two keys.

In some embodiments, to locate a particular mempool node associated with k, mempool nodes 204 forward the lookup requests to other peers whose identifiers are closer to k according to the distance function. Furthermore, the mempool nodes 204 may maintain links to a subset of the other mempool nodes 204. As described in greater detail below in connection with FIG. 6, a lookup request is forwarded by mempool nodes 204 until either a mempool node associated with k is found, or no node is found with an identifier closer to the requested key according to the routing protocol presented in this disclosure.

In the DMP 106, keys are distributed among a potentially very large number of mempool nodes 104. In various embodiments, each mempool node 204 contains information capable of identifying (e.g., network address, key information, physical location, etc.) a subset of other mempool nodes 204, such that a lookup can be routed deterministically to the mempool node 204 responsible for the requested key. This limited view of the membership of the DMP 106 may provide the system with greater scalability.

The DMP 106 is implemented using the DHT protocol described in the present disclosure. The DHT protocol, in various embodiments, provides two operations: 1) a storage operation and 2) a retrieval operation. Given a blockchain transaction $T_i$, an identifier $id(T_i)$ can be assigned as follows: $id_i = H(T_i)$, where H represents a hash function. In various embodiments, the identifier ($id_i$) will be used as key in the DMP 106. Furthermore, as described above, a specific address may be used so that the blockchain transaction can be received from multiple validator nodes 208. Each validator node 208 may then verify the blockchain transaction $T_i$ independently.

As illustrated in FIG. 2, each validator node 208 maintains a local database 214. In the embodiment illustrated in FIG. 2, entries of the local database 214 contain the identifier of a blockchain transaction $id_i$ and a binary decision for a validation operation perfumed on $T_i$, e.g., '0' to reject and '1' to accept, or 'Y' to accept or 'N' to reject. This information may be used for fast response to validation or retrieval queries. In some embodiments, a number of validators nodes 208 will independently verify $T_i$ and then the number validator nodes 208 will send a store($T_i$, $id_i$) request or reject($id_i$) request to the DMP 106, based at least in part on a result of verifying $T_i$. In these embodiments, the store message causes $T_i$ to be stored at a mempool node 204 associated with $id_i$ and the reject message causes mempool nodes 204 to reject requests including $id_i$. In addition, mempool nodes 204 may only store $T_i$ if N/2+1 store($T_i$, $id_i$) request are received, where N is the number of validator nodes 208.

In yet other embodiments, reject messages are not to be used, and as soon as a mempool node 204 receives a first store($T_i$, $id_i$), mempool node 204 activates a timer for the reception of N/2 more store messages. In such embodiments, if the timeout is exceeded and not enough store messages are received, the blockchain transaction is discarded. In addition, each mempool node 204 may maintain the number of received store messages greater than N/2+1 for $T_i$. These mechanisms may be used to maintain quorum requirements and/or to ensure that consensus is reached among a quorum. In some embodiments, the mempool node 204 maintains a database 210 or other data structure that is used to store the number of validations received from the validator nodes 208 for a given blockchain transaction.

In various implementations of the DHT protocol described in the present disclosure, retrieval of a validated blockchain transaction $T_i$ requires the broadcast of a message including $id_t$ to be sent to at least one mempool node 204. The particular mempool nodes responsible for the storage of $id_t$ will send a message, including the data associated with the $id_t$, to the query node. In this implementation, if M mempool nodes are required to store $T_t$, at least M/2+1 messages, including the data associated with the $id_t$, are received by the query node to consider the stored blockchain transaction consistent. Moreover, a query node may interrogate N/2+1 random validator nodes 208 to determine the validity of $T_t$ according to the information stored in validator node's 208 local database 214.

As described in greater detail below in connection with FIG. 3, the key-value pairs of the DMP 106 may be stored in tables 210 maintained by the mempool nodes 204. The tables 210 may contain information associated with the DHT protocol, such as the distinct function described above. Although the validator nodes 208 and the mempool nodes 204 are illustrated in FIG. 2 as distinct entities, in various embodiments, one or more mempool nodes 204 and/or validator nodes 208 may be executed by the same entity, such as a computer system. For example, as described above in connection with FIG. 1, a merchant node executes a plurality of components of a blockchain protocol. In yet other embodiments, the DMP 206 is implemented without the validator nodes 208. In one example of such embodiments, $T_t$ 202 is stored directly by the mempool nodes 204 without the performance of any validation operations. In another example, the mempool nodes 204 themselves may perform validation operations before processing $T_t$ 202.

Figure 3:
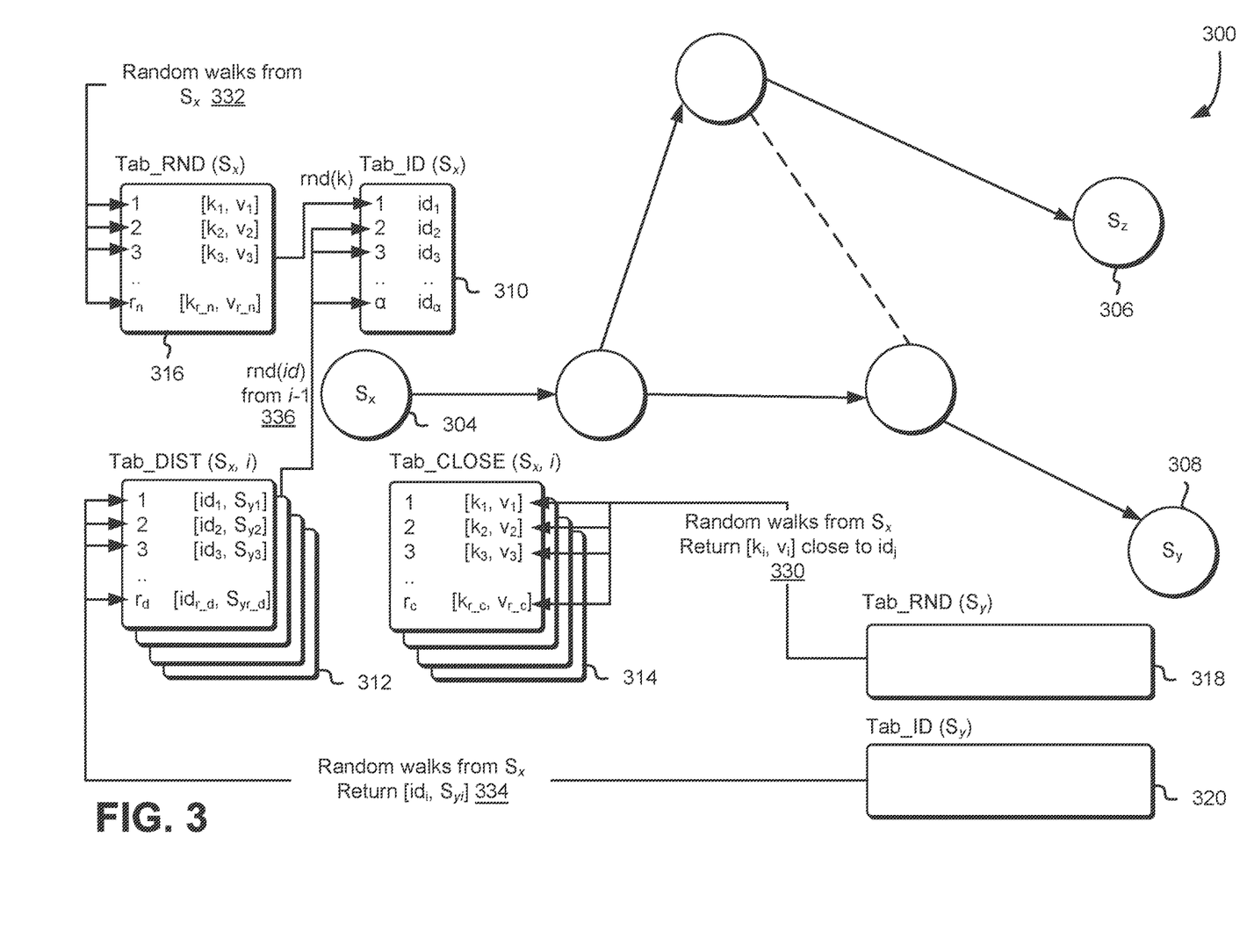
FIG. 3 illustrates an example network of mempool nodes implementing an operation to update routing information of a mempool node of a DMP network in accordance with an embodiment.

FIG. 3 illustrates, in diagram form, an example embodiment 300 of an update to routing information of a set of mempool nodes of a DMP network. The example embodiment 300 illustrated in FIG. 3 depicts a new mempool node $S_x$ 304, and existing mempool node $S_y$ 308, and another existing mempool node $S_z$ 306. As described above, the DHT protocol relies on a network composed of individual trust relations between mempool nodes. A set of connections for a particular mempool node (e.g., $S_x$) may be generated based at least in part on a collection of both routing information and application-level information.

In various embodiments, no central authority is involved in the release or storage of trust certifications. In such embodiments, each mempool node maintains records of trusted peers relative to the mempool node. In various other embodiments, mempool node $S_x$ 304 is not a new mempool node, for example, during an update procedure.

Given a number of mempool nodes n in a network (e.g., DMP 106), the number of routing table records r per mempool node may be dimensioned (or scaled) according to:

$$r=\sqrt{n}\log(n)$$

Figure 4:
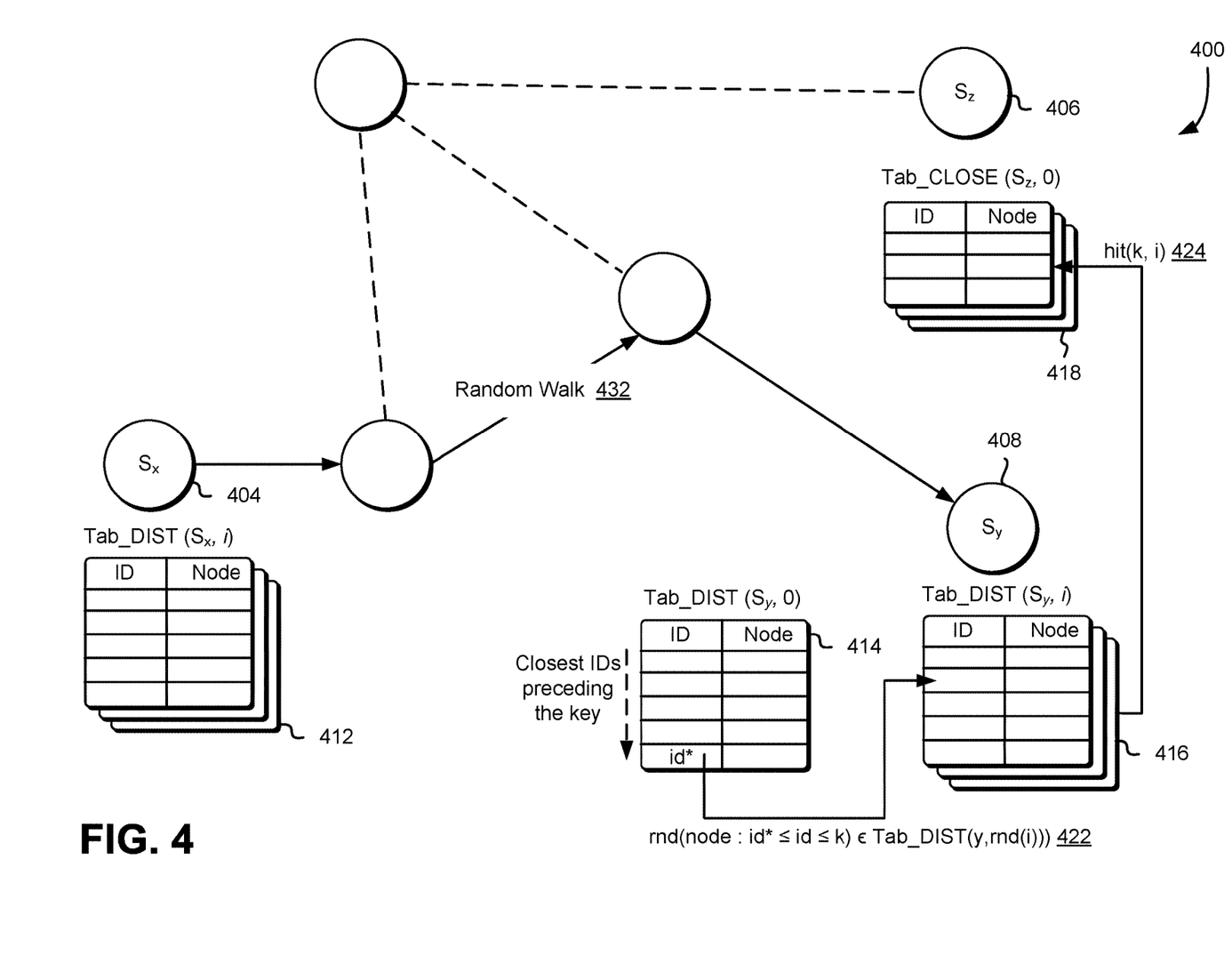
FIG. 4 illustrates an example network of mempool nodes implementing a retrieval operation of a DMP network in accordance with an embodiment.

As described above, the DHT protocol defines two functions and/or operations—an update operation and a get operation. The update operation, in various embodiments, is used to build routing tables and insert keys at each mempool node. The get operation, as described in greater detail below in connection with FIG. 4, is used by a particular node (e.g., $S_x$) to find the target key-value pair (e.g., a record in the DHT) represented by key k.

In various embodiments, a particular mempool node (e.g., $S_x$) is identified by a public key. For example, mempool node $S_x$ 304 identification information is represented by a public key $P_x$, and a current IP address $addr_x$ of $S_x$ 304, which are securely linked by using the following record defined by $Sign_x(P_x, addr_x)$, where $Sign_x( )$ represents a signature generated using a private key associated with $S_x$ 304. The node identification information may then be stored in the DMP using the signed record. In some embodiments, to send a message to a peer $S_y$ 308, the mempool node $S_x$ 304 queries the DMP using the identifier $P_y$. The mempool node $S_x$ 304 then verifies the signature of any record (e.g., $(P_y, addr_y)$) returned in response to the queries using the public key of $S_y$ 308, $P_y$. Once the mempool node $S_x$ 304 verifies the information, $S_x$ 304 sends a message directly to $addr_y$ of $S_y$ 308. In such embodiments, when a mempool node changes locations or receives a new network address, a new record is generated and stored in the DMP.

The DHT protocol may be considered robust relative to Sybil attacks if the get operation described above has a high probability (relative to other protocols) of returning the correct value despite malicious actions on both the update and get operations. In various embodiments, the DHT protocol has the following properties to reduce the effectiveness of Sybil attacks or other attacks: routing table information is minimized to reduce space complexity to avoid problems, such as overloading, generated by a large number of false nodes; new nodes generate their own routing information by collecting information from peers, thereby reducing the impact of a malicious node repetitively sending false information, and the key space is non-deterministic to avoid clustering attacks.

Data routing in the DMP can be represented by an undirected graph. Given a number of malicious edges g and a number of mempool nodes n, the property g<<n (g much lower than n), in some embodiments, guarantees an operational network for the DMP 106. While an attacker may create an arbitrary number of malicious nodes, it may be difficult for the malicious node to create an edge (e.g., network connection or relationship) with a mempool node. For example, a random walk starting from a mempool node is likely to end at another mempool node and not a malicious node. However, since the starting mempool node may not able to determine which returned messages were originated from malicious nodes, no assumptions on the truthfulness of the messages may be made. These properties are described in detail in Haifeng Yu et al. *SybilLimit: A Near-Optimal Social Network Defense Against Sybil Attacks*, IEEE/ACM Transactions on Networking, vol. 18, no. 3 (2010) and F. R. K. Chung *Spectral Graph Theory* Conference Board of the Mathematical Sciences, no. 92 (1994) hereby incorporated by reference to the same extent as if each reference were individually and specifically indicated to be incorporated by reference and were set forth in its entirety in the present disclosure.

As illustrated by FIG. 3, $S_x$ 304 may generate routing information by performing random walks 332. $S_x$ 304 routing table, in an embodiment, is generated by initiating r independent random walks of length w in the DMP. The r independent random walks of length w may be generated and information retrieved from the random walks is stored in a table Tab_RND ($S_x$) 316. Using these random walks, $S_x$ 304 may collect one or more random key-value records from the recipient mempool node of each random walk. This information may then be stored in a table Tab_DIST ($S_x$, i) 312, where i represents a routing iteration.

As described in greater detail below, this routing information is used during the lookup operations such as get. If a Tab_CLOSE ($S_x$, i) 314 table of $S_x$ 304 local table does not contain the key, a lookup message is transmitted to the r nodes in $S_x$ 304 routing table (e.g., Tab_DIST ($S_x$, i) 312). Depending on the value of r, one or more mempool nodes may be likely to have the queried key-value record locally stored (e.g., in the particular nodes Tab_CLOSE table). In addition, the protocol may define $r_n$, $r_d$, or $r_c$ where $r_n$ is the number of elements of Tab_RND ($S_x$) 316, $r_d$ is the number of elements of Tab_DIST ($S_x$, i) 312, and $r_c$ is the number of elements of Tab_CLOSE ($S_x$, i) 314. In various embodiments, the values $r_n$, $r_d$, or $r_c$ may be the same as r.

In various embodiments, routing information is generated only by performing a number of random walks. In addition, random walks distribution may be balanced because of the different number of edges between different mempool nodes. Therefore, if each physical mempool node replicates itself according to a number of edges, the total number of keys stored in the system will be mK, where m is the number of honest edges and K is the number of keys stored per mempool node, and the number of independent random walks will be dimensioned according to $O(\sqrt{mK})$.

In some embodiments, a global circular lexicographical ordering for the keys is used. For example, given any index a<i<b, a key $k_i$ is located in a portion of space between two nodes $x_a$ and $x_b$. As described above, the keys are not stored in the shared key space using deterministic functions (e.g., a hash function) to prevent malicious nodes from brute-forcing a desired output and inserting wrong keys between two honest keys.

As illustrated in FIG. 3, the node $S_x$ 304 generates a long-distance routing table, Tab_DIST ($S_x$, i) 312, containing r pointers to other mempool nodes with identification information uniformly distributed over the key space. In such embodiments, pointers are stored by initiating r random walks and collecting random identification information from the ending mempool node. The short-distance routing table, Tab_CLOSE ($S_x$, i) 314, contains r key-value records. These keys are the closest following $S_x$ 304 identification information in the lexicographical ordering.

According to this routing model, each node uses a random walk to choose a random key, thereby providing a uniform distribution of pointer over-the-key space. In addition, clustering attacks may be prevented by extending this routing model recursively. In various embodiments, at a given iteration i, each mempool node picks a random entry from the previous (i−1)-th long-distance table 336 (e.g., Tab_DIST ($S_x$, i−1)) and uses that pointer to select identification information to store in Tab_ID ($S_x$) 310. An a-degree of recursion may ensure that each mempool node exists at a locations and collects short-distance tables for a different identification information in the key space. Accordingly, the degree of recursion can be dimensioned according to O(log mK).

As illustrated in FIG. 3, the update operation consists of two phases. During the first phase, the node $S_x$ 304 initializes the random walks for the collection of key-value records to be storage in Tab_RND ($S_x$) 316. During the second phase, for the iterations of the update operations i<α, the other routing tables Tab_ID ($S_x$) 310, Tab_DIST ($S_x$, i) 312, and Tab_CLOSE ($S_x$, i) 314 are generated. In various embodiments, the number of entries in each table may be limited to a certain number of total entries. Returning to FIG. 3, during a routing iteration, mempool identification information may be recursively selected based at least in part on the current routing iteration.

In addition as described above, a Tab_ID ($S_x$) 312 record may be created by selecting a random identification information from a record in $S_x$ 304 (i−1)-th TAB_DIST table. In some embodiments, the first entry is a random key from the Tab_RND ($S_x$) 316 table. Furthermore, in an embodiment, a Tab_DIST ($S_x$, 0312 record is created by performing a random walk to a mempool node 334 (e.g., node $S_y$ 308) and collecting a resulting mempool node's address and the i-th identification information from its Tab_ID table 320. Finally, Tab_CLOSE ($S_x$, i) 314 may be generated based at least in part on information included in Tab_RND ($S_x$) 316 by at least requesting records of Tab_RND 318, which are the lexicographically close relative to at least one other key following the identification information at a given iteration i.

In various embodiments, queries required to collect routing information are independent and randomly distributed in the space of keys close to particular identification information.

FIG. 4 illustrates, in diagram form, an example embodiment 400 of a get operation performed by a mempool node of a DMP implementing a DHT. The example embodiment 400 illustrated in FIG. 4 depicts a mempool node $S_x$ 404 contacting existing mempool node $S_y$ 408 and mempool node $S_z$ 406 to locate a target record maintained by node $S_z$ 406 in the DMP. As described above, the DHT protocol relies on a network composed of individual trust relations (e.g., connections) between mempool nodes. A set of connections for a particular mempool node (e.g., $S_x$) may be generated as described above and include a table (e.g., Tab_DIST 412) containing a set of records indicating mempool nodes distributed in the key space and a network address associated with mempool nodes.

In various embodiments, retrieving the target record consists of finding a routing pointer in the long distance routing table, which has the target mempool node in its short-distance routing table 418. As described in greater detail below in connection with FIG. 6, this process may be iterative, such that the get operation cause computing resources executing the get operation to follow a plurality of routing pointers to successive long-distance routing tables until a target mempool node with the target record in its short-distance routing table 418.

As described above, the update operation may ensure that some long-distance pointers in the entire key space maintain routing information about the target record and/or target key. In addition, at least some of the long-distance points may not be associated with a malicious entity. As illustrated in FIG. 4, the key-value retrieval procedure (e.g., a get operation) initiated from node $S_x$ 404 first starts with a scan of $S_x$ 404 Tab_DIST 412 table for routing pointers. If the target record cannot be reached (e.g., a routing pointer or other information is not included in the Tab_DIST 412), a random walk 432 to node $S_y$ 308 may be executed to repeat the procedure. As illustrated in FIG. 4, the random walk 432 is shown as a solid line between mempool nodes, and other possible random walks are illustrated by a dashed line.

During an iteration of the get operation the node's $S_y$ 408 Tab_DIST. table 414 may be searched for the closest identification information (shown in FIG. 4 as 'id*') to the target record (e.g., key) being searched. In various embodiments, given a random iteration i, a random pointer to node $S_z$ 406 in Tab_DIST($S_y$, i) 416 is selected. In such embodiments, the selected long-distance pointer to node $S_z$ 406 must be within the range given by id* and k. For example, the identification information of node $S_z$ 406 must satisfy the following condition 422: id*≤identification information of node $S_z$ 406≤k.

The selected node (e.g., node $S_z$ 406 in the example illustrated in FIG. 4) is then queried for the records associated with key k. If there is a hit (k, i) on the record 424 (e.g., the record is in the i-th instance of Tab_CLOSE table 418 of node $S_z$ 406), the node $S_z$ 406 may return the record to the mempool node responsible for transmitting the query, node $S_y$ 408 in the example illustrated in FIG. 4. In addition, node $S_y$ 408 may then return the record to node $S_x$ 404 based at least in part on the query transmitted from node $S_x$ 404 to node $S_y$ 408. For example, the record may be based along the same route taken to locate the record. If there is no hit on the record, the get operation may continue and execute another iteration.

In various embodiments, signed messages are exchanged between peers in the DMP (e.g., mempool nodes connected by a single hop in the network) to detect trusted connections between other nodes mempool nodes. For example, if node $S_y$ 408 and node $S_x$ 404 are peers (e.g., are bound by a trusted connection), and also node $x_1$, node $x_2$, and node $x_3$ are node's $S_x$ 404 peers, then node $S_y$ 408 requests direct connections to node $x_1$, node $x_2$, and node $x_3$. Furthermore, to increase the level of security, node $x_1$, node $x_2$, and node $x_3$ may be directly inquired to verify their current connections. If the connections are confirmed, node $S_y$ 408 may determine to create a new connection to one of node $S_x$ 404's peers, for example, node $x_2$. In such embodiments, a new connection is granted only if node $x_2$ responds positively to the connection request.

In yet other embodiments, mempool nodes may assign different weights $\beta_{x,i}$ to trusted connections between particular mempool nodes. For example, node $S_x$ 404 may assign weights to peers node $x_1$, node $x_2$, and node $x_3$ based at least in part on the following constraint:

$$0 < \beta_{x,i} \le 1, \sum_{i=1}^{m_x} \beta_{x,i} = 1$$

In various embodiments, a higher trust in a peer corresponds to a higher weight. For example, between node $S_y$ 408 with weight $\beta_{x,z}=\frac{2}{3}$ and node $S_z$ 406 with $\beta_{x,y}=\frac{1}{3}$, the node $S_y$ 408 is considered more trustworthy, where both node $S_y$ 408 and node $S_z$ 406 are peers of the same mempool node (e.g., node $S_x$ 404). In addition, the weights may be used to adjust the probabilities of choosing individual hops in the random walks or to initialize new transitive connections as described above. Returning to the example above, if $\beta_{x,y}=\frac{1}{3}$ and $\beta_{x,z}=\frac{2}{3}$, node $S_z$ 406 will have double the probability of node $S_y$ 408 to be reached from node $S_x$ 404.

In such embodiments, each mempool node is responsible for maintaining weight information associated with other mempool nodes. In addition, relative to node $S_x$ 404, node $S_x$ 404 may update the peer weight values by at least reducing a weight, for example the weight $\beta_{x,y}$, by a value c and increasing at least one of the other weights by $\varepsilon/(m_x-1)$. The node $S_x$ 404 may determine to reduce a weight associated with a peer, for example, if node $S_y$ 408 fails to provide a valid key-value record in cases where the key falls in node's $S_y$ 408 Tab_CLOSE.

Figure 5:
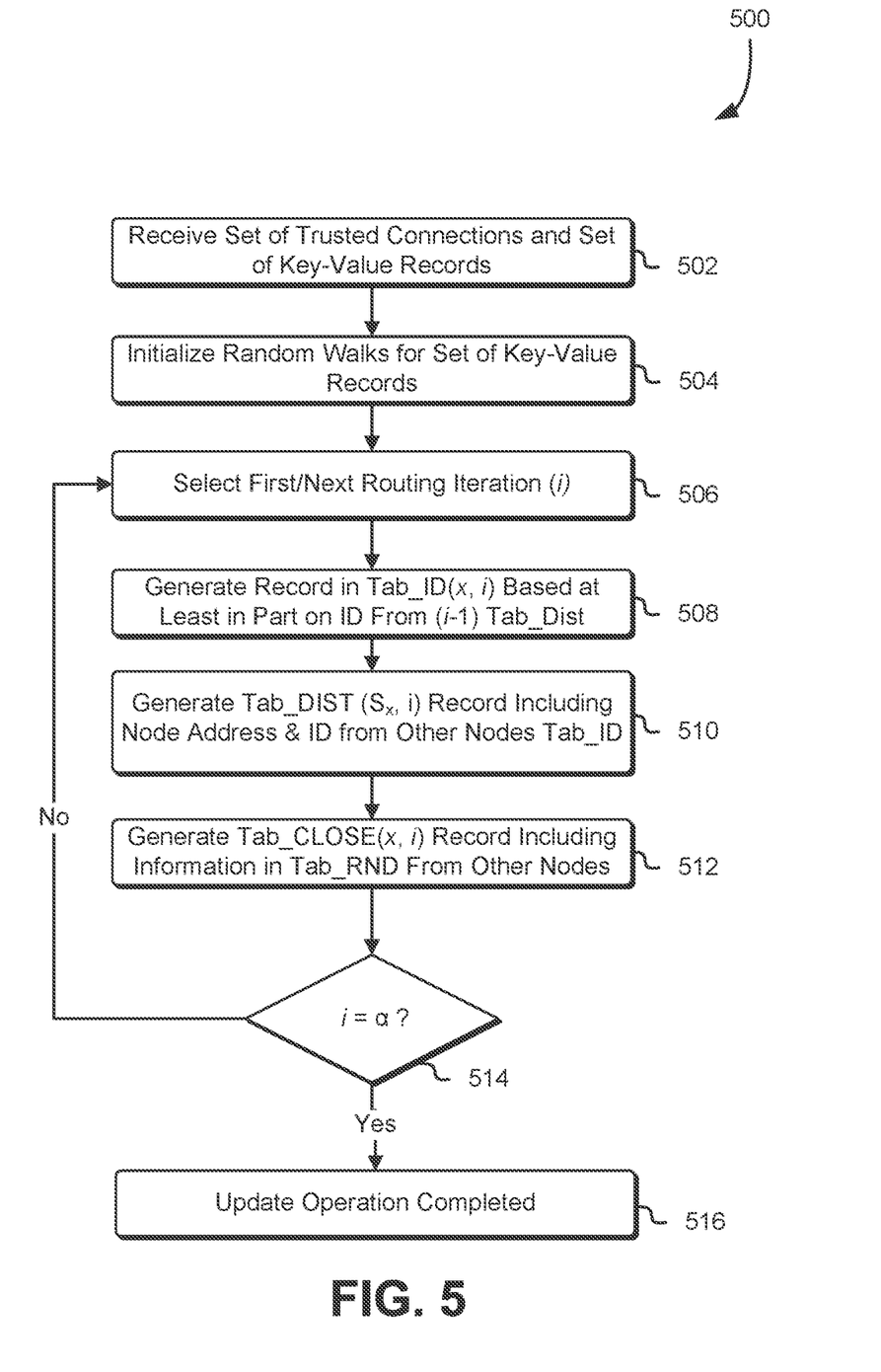
FIG. 5 illustrates a flowchart of an example process for updating routing information of a mempool node of a DMP network in accordance with an embodiment.

FIG. 5 illustrates, in flowchart form, an example process 500 for executing an update operation to generate routing information for a mempool node of a DMP in accordance with an embodiment. Some or all of the process 500 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 500 may be performed by a mempool node, such as one of the mempool nodes 204 described in connection with FIG. 2 of the DMP 206 described in connection with FIG. 2.

That is, a mempool node, such as one of the mempool nodes 204 described in connection with FIG. 2, may perform the example process 500 for executing an update operation described in connection with FIG. 5. Such a mempool node may be comprised of any suitable computing device (e.g., by a server in a data centre, by a client computing device, by multiple computing devices in a distributed system of a computing resource service provider, or by any suitable electronic client device). In addition, the process 500 may be executed periodically or aperiodically, in response to a triggering event (e.g., in response to a new mempool node joining the DMP or the failure of an existing mempool node), or for any other suitable reason for updating routing information.

The example process 500 includes a series of operations wherein the system performing the example process 500 executes an update operation of a DHT protocol as described above. In step 502 of the example process 500, the system receives a set of trusted connections and a set of key-value records. The set of trusted connections and the set of key-value records may be received as inputs to the update operation. In various embodiments, this information may be omitted or otherwise null (e.g., the may be no trusted connection and/or no key-value records stored by the mempool node).

In step 504, the system initializes random walks for a set of key-value records.

As described above, a set of random walks may be initialized, which is used to create a set of distances distributed within the key space. Generating the random walks may be part of an initial phase of the update operation as described above. In addition, the random walks may be generated randomly or pseudorandomly. In step 506, the system then selects the first/next routing iteration i. As described above, the update operation may recursively generate routing information over a number of routing iterations from 1 to $\alpha$.

In step 508, the system generates the i-th record of Tab_ID ($S_x$, i) based at least in part on identification information obtained from Tab_DIST ($S_x$, i–1). In embodiments where Tab_ID ($S_x$, i–1) does not exist (e.g., where there is only one table in Tab_DIST, such as with a new mempool node), a random key is selected from the Tab_RND table location to the system (e.g., mempool node).

In step 510, the system generates a Tab_DIST ($S_x$, i) record including the node address and identification information from the Tab_ID ($S_y$) table. As described above in connection with FIG. 3, a random walk is performed and address information is obtained from the mempool node contacted as a result of performing the random walk. This identification information and address information of the mempool nodes is then stored as a record in the Tab-DIST ($S_x$, i) table.

In step 512, the system generates a Tab_CLOSE ($S_x$, i) record including information obtained from the Tab_RND table of the mempool node contacted as a result of performing the random walk. As described above in connection with FIG. 3, the mempool node transmits the local (relative to the mempool node) records of Tab_RND which are lexicographically closest to the identification information at a particular iteration of the update operation.

In step 514, the system determines if additional iterations remain 514. For example, the process 500 may have a set number of iterations. In another example, the system executing the process 500 determines a number of iterations in step 504 during initialization of the update operation. In yet another example, the system may continue to iterate the process 500 until a certain amount of routing information is obtained. If the number of iterations has not been reached, the system returns to step 506. If the number of iterations has been reached, the system proceeds to step 516 and completes the update operation.

Note that one or more of the operations performed in the example process 500 illustrated in FIG. 5 may be performed in various orders and combinations, including in parallel.

In addition, one or more of the operations performed in the example process 500 illustrated in FIG. 5 may be omitted.

Figure 6:
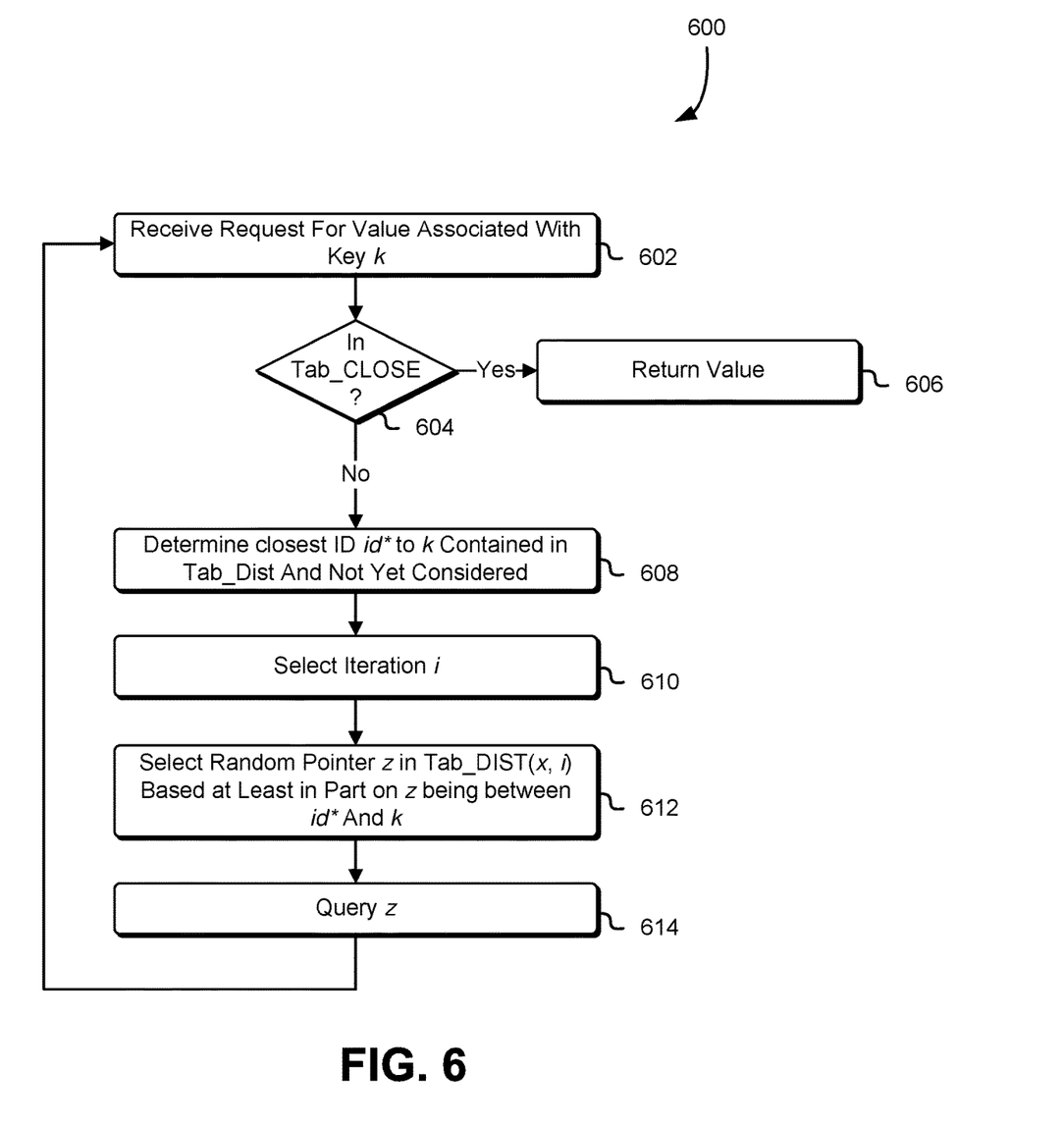
FIG. 6 illustrates a flowchart of an example process for retrieving information from mempool nodes of a DMP network in accordance with an embodiment.

FIG. 6 illustrates, in flowchart form, an example process 600 for executing a get operation to obtain data associated with a key for a mempool node of a DMP network in accordance with an embodiment. Some or all of the process 600 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 600 may be performed by a mempool node such as one of the mempool nodes 204 described in connection with FIG. 2 of a DMP, such as the DMP 206 described in connection with FIG. 2.

That is, a mempool node, such as one of the mempool nodes 204 described in connection with FIG. 2, may perform the example process 600 for executing a get operation described in connection with FIG. 6. Such a mempool node may be comprised of any suitable computing device (e.g., by a server in a data centre, by a client computing device, by multiple computing devices in a distributed system of a computing resource service provider, or by any suitable electronic client device).

The example process 600 includes a series of operations wherein the system performing the example process 600 executes a get operation of a DHT protocol as described above. In step 602 of the example process 600, the system receives a request for a value associated with a key k. The request may be received from a system external to the DMP network or from a mempool node that is a member of the DMP network.

In step 604, the system performs a lookup operation in the table Tab_CLOSE to determine if the value associated with the key k is located in a record of the table. In step 606, if the record is in the table, the system returns the value associated with the key. However, if the record is not in the table Tab_CLOSE, the system may proceed to step 608.

In step 608, the system determines the closest identification information (id*) to the key k contained in the Tab_DIST table. As described above, the distance may be determined based at least in part on the update operation described above in connection with FIG. 3.

In step 610, the system may select an iteration i. The iteration may be selected randomly or pseudorandomly. In addition, the iteration may represent a particular table generated during an iteration of the update operation as described above.

In step 612, the system selects a random pointer z from the table Tab_DIST ($S_x$, i) based at least in part on the z being between id* and k. As described above, the pointer may be an address to another mempool node of the DMP network implementing the DHT. In this manner, the system may, during successive iterations of the get operation, move in the key space toward a particular mempool node associated with the key that contains the value in the table Tab_CLOSE of the particular mempool.

In step 614, the system queries the mempool node at the pointer z. The query, in various embodiments, includes the key k. In addition, the query may include additional information, such as an address associated with a requester. In various embodiments, the additional information enables the mempool node associated with the key k and containing the value to transmit the value directly to the address associated with the requester. This is in contrast to transmitting the response to the mempool node responsible for transmitting the query and possibly avoiding additional network traffic as information is returned along the same network path through the DMP network.

The specification and drawings are, accordingly, to be regarded in an illustrative rather than a restrictive sense. However, it will be evident that various modifications and changes may be made thereunto without departing from the broader spirit and scope of the invention as set forth in the claims.

Note that one or more of the operations performed in the example process 600 illustrated in FIG. 6 may be performed in various orders and combinations, including in parallel.

In addition, one or more of the operations performed in the example process 600 illustrated in FIG. 6 may be omitted. In various embodiments, there is a maximum number of iterations the process 600 will be performed and if no value is returned the process 600 is terminated.

Figure 7:
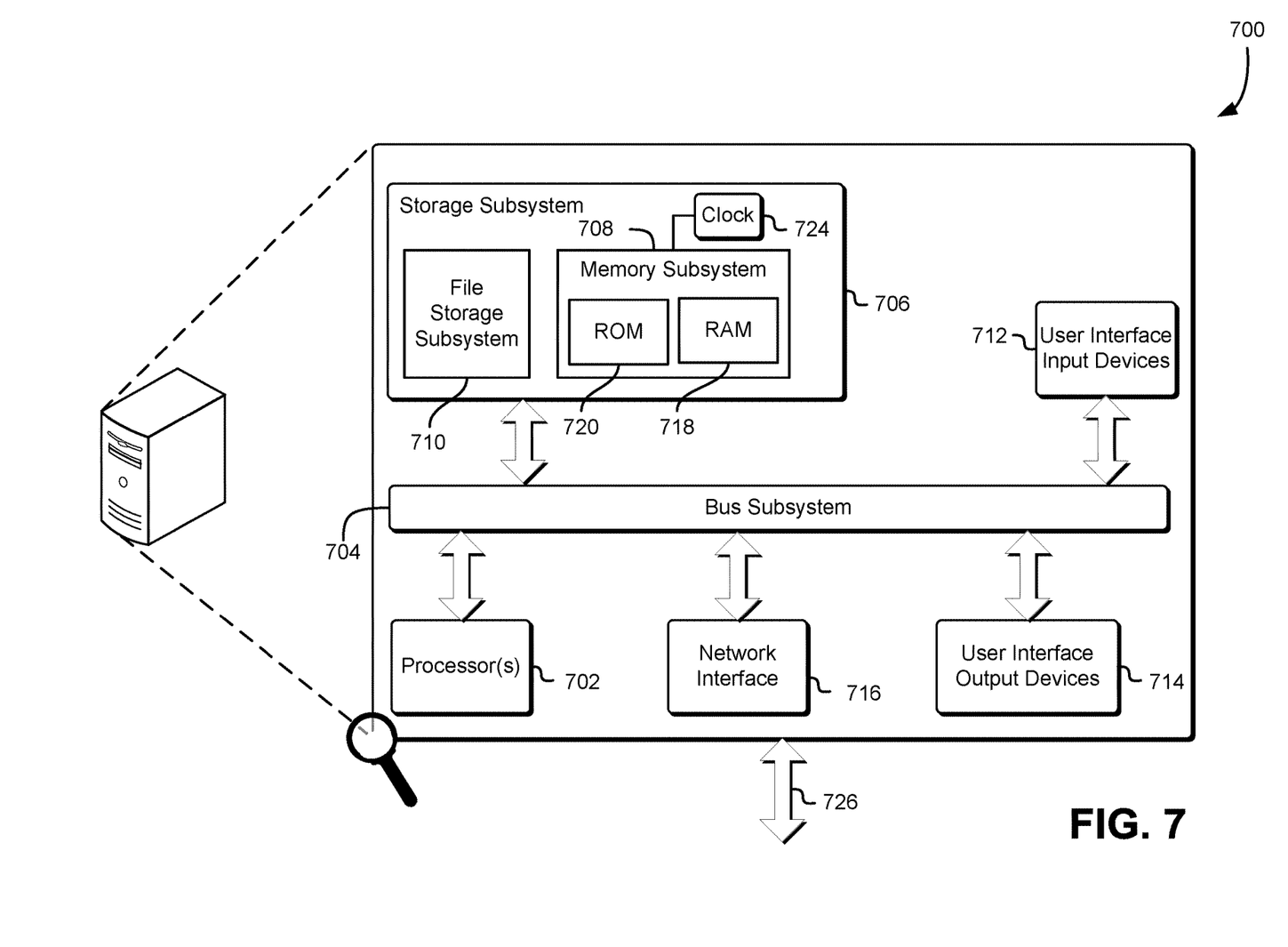
FIG. 7 illustrates a diagram of an example environment where various embodiments can be implemented.

FIG. 7 illustrates, in diagram form, an example computing device 700 where various embodiments of the invention can be implemented. FIG. 7 illustrates a simplified diagram of an example computing device 700 that may be used to practice at least one embodiment of the present disclosure. In various embodiments, the example computing device 700 may be used to implement any of the systems or methods illustrated herein and described above. For example, the example computing device 700 may be configured for use as a data server, a web server, a portable computing device, a personal computer, or any electronic computing device. As shown in FIG. 7, the example computing device 700 may include one or more processors 702 that may be configured to communicate with, and are operatively coupled to, a number of peripheral subsystems via a bus subsystem 704. The processors 702 may be utilized to implement a method described herein. These peripheral subsystems may include a storage subsystem 706, comprising a memory subsystem 708 and a file storage subsystem 710, one or more user interface input devices 712, one or more user interface output devices 714, and a network interface subsystem 716. Such storage subsystem 706 may be used for temporary or long-term storage of information associated with blockchain transactions or operations described in the present disclosure.

The bus subsystem 704 may provide a mechanism for enabling the various components and subsystems of the example computing device 700 to communicate with each other as intended. Although the bus subsystem 704 is shown schematically as a single bus, alternative embodiments of the bus subsystem may utilize multiple busses. The network interface subsystem 716 may provide an interface to other computing devices and networks. The network interface subsystem 716 may serve as an interface for receiving data from, and transmitting data to, other systems from the example computing device 700. For example, the network interface subsystem 716 may enable a user to connect the device to a wireless network or some other network such as those described herein. The bus subsystem 704 may be utilized for communicating data associated with blockchain transactions or operations described in the present disclosure to the one or more processors 702 and/or to other entities outside of the system via the network interface subsystem 716.

The user interface input devices 712 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 700. The one or more user interface output devices 714 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 700. The one or more output devices 714 may be used, for example, to present user interfaces to facilitate user interaction with applications performing processes described herein and variations therein, when such interaction may be appropriate.

The storage subsystem 706 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, and may be stored in the storage subsystem 706. These application modules or instructions may be executed by the one or more processors 702. The storage subsystem 706 may additionally provide a repository for storing data used in accordance with the present disclosure. The storage subsystem 706 may comprise a memory subsystem 708 and a file/disk storage subsystem 710.

The memory subsystem 708 may include a number of memories, including a main random access memory (RAM) 718 for storage of instructions and data during program execution and a read only memory (ROM) 720 in which fixed instructions may be stored. The file storage subsystem 710 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The example computing device 700 may include at least one local clock 724. The local clock 724 may be a counter that represents the number of ticks that have transpired from a particular starting date and may be located integrally within the example computing device 700. The local clock 724 may be used to synchronize data transfers in the processors for the example computing device 700 and all of the subsystems included therein at specific clock pulses and may be used to coordinate synchronous operations between the example computing device 700 and other systems in a datacenter. In one embodiment, the local clock 724 is an atomic clock. In another embodiment, the local clock is a programmable interval timer.

The example computing device 700 may be of various types, including a portable computer device, tablet computer, a workstation, or any other device described herein. Additionally, the example computing device 700 may include another device that may be connected to the example computing device 700 through one or more ports 726 (e.g., USB, a headphone jack, Lightning connector, etc.). The device that may be connected to the example computing device 700 may include a plurality of ports configured to accept fiber-optic connectors. Accordingly, device that may be connected to the example computing device 700 may be configured to convert optical signals to electrical signals that may be transmitted through the port connecting the device to the example computing device 700 for processing. Due to the ever-changing nature of computers and networks, the description of the example computing device 700 depicted in FIG. 7 is intended only as a specific example for purposes of illustrating an embodiment of the device. Many other configurations having more or fewer components than the system depicted in FIG. 7 are possible.

One or more embodiments of the invention may be described as providing an improved blockchain-implemented method and system. It may provide improved speed of operations via the blockchain network, by enabling faster reading and writing operations. It may also provide improved security for a blockchain-implemented system in that it prevents attacks or malicious activities such as routing and storage attacks eg in the distributed memory pool. Therefore, the invention may provide a more secure blockchain solution. It may also provide a mechanism for ensuring the network-wide consensus of the validity of blockchain transactions stored in the distributed memory pool, thus enhancing the overall performance, reliability and security of the network. It also provides improved architectures, and also improved storage resources and capabilities for blockchain systems. Other advantages of the invention may also be provided.

It should be noted that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
receiving, at a mempool node of a distributed mempool network (DMP) implementing a distributed hash table (DHT), a request to update routing information of the mempool node, the update occurring in two phases:
at a first phase:
initializing a set of random walks within a key space of the DHT, the set of random walks used for generating a set of key-value records to be stored in a first table Tab_RND (Sx); and
at a second phase:
generating, for a number of iterations where each iteration being i less than value α, three other tables: second table Tab_ID (Sx), third table Tab_DIST (Sx, i), and fourth table Tab_CLOSE (Sx, i);
creating a second table record for second table Tab_ID (Sx) by selecting a random identification information from a record Sx (i-1)-th Tab_DIST table, wherein a first entry is a random key from the first table Tab_RND (Sx);
creating a third table record for third table Tab_DIST (Sx, i) by performing a random walk to the mempool node and collecting a resulting mempool node's address and i-th identification information from a table Tab_ID (Sy) corresponding to a portion of the third table Tab_DIST (Sx, i);
generating a fourth table Tab_CLOSE (Sx, i) based on information included in the first table Tab_RND (Sx) by at least requesting records of a table Tab_RND (Sy) corresponding to a portion of the first table Tab_RND (Sx), which are a lexicographically close relative to at least one other key following the identification information at a given iteration i;
receiving, at the mempool node, a request for a value associated with a key;
selecting, from a fifth table of a long-distance table type, third identification information relative to at least some other identification information included in the fifth table;
selecting a particular iteration of a long-distance table of a set of long-distance tables of which the third table is a member;
selecting, from the particular iteration of the long-distance table, a pointer within a range between the third identification information and the key; and
transmitting a query to a third mempool node associated with the pointer,
wherein the mempool node maintains a set of weight associated with a set of connections to a set of other mempool nodes, wherein the weight is proportional to the level of trust in the connection with the set of other mempool nodes.

2. The computer-implemented method claimed in claim 1, wherein the request to update routing information is part of an update operation executed over a number of iterations.

3. The computer-implemented method claimed in claim 2, wherein the update operation is terminated after the number of iterations is completed, the number of iterations being defined by a DHT protocol.

4. The computer-implemented method claimed in claim 1, further comprising creating, the mempool node, a set of trusted connections with a set of other mempool nodes.

5. The computer-implemented method claimed in claim 4, wherein the set of trusted connections is modified.

6. The computer-implemented method claimed in claim 4, wherein the request to update routing information of the mempool node is a result of modifying the set of trusted connections.

7. The computer-implemented method claimed in claim 1, wherein the second record in the second table is pseudo-randomly selected.

8. The computer-implemented method claimed in claim 1, wherein the first record in an ID table is selected from information generated during initializing the set of random walks.

9. The computer-implemented method claimed in claim 1, wherein selecting, from the particular iteration of the long-distance table, the pointer within the range between the third identification information and the key is performed randomly.

10. The computer-implemented method claimed in claim 1, wherein the request to update routing information of the mempool node is a result of instantiation of a new mempool node.

11. The computer-implemented method claimed in claim 1, wherein the request to update routing information of the mempool node is a result of at least one other mempool node failing.

12. The computer-implemented method claimed in claim 1, wherein the request to update routing information of the mempool node is a result of modifying a set of keys associated with the DMP.

13. The computer-implemented method claimed in claim 1, wherein the DMP obtains a plurality of storage requests from a set of validator nodes.

14. The computer-implemented method claimed in claim 1, wherein the mempool node updates a weight of the set of weights as a result of at least one other mempool node failing to provide a valid key-value record.

15. The computer-implemented method claimed in claim 1, wherein the mempool node of the DMP implements a consensus protocol to provide consensus among a plurality of mempool nodes of the DMP on a set of values included in the fourth table.

16. The computer-implemented method claimed in claim 1, wherein the mempool node stores a second value that is also stored by at least one other mempool node of the DMP.

17. A system, comprising:
a processor; and
memory including executable instructions that, as a result of execution by the processor, cause the system to perform the computer-implemented method of claim 1.

18. A non-transitory computer-readable storage medium having stored thereon executable instructions that, as a result of being executed by a processor of a computer system, cause the computer system to at least perform the computer-implemented method of claim 1.

* * * * *